United States Patent
Kawano

(10) Patent No.: US 9,315,320 B2
(45) Date of Patent: Apr. 19, 2016

(54) AUTOMATED WAREHOUSE SYSTEM

(75) Inventor: Yasushi Kawano, Chiba (JP)

(73) Assignee: Amazon Technologies, Inc., Reno, NV (US)

( * ) Notice: Subject to any disclaimer, the term of this patent is extended or adjusted under 35 U.S.C. 154(b) by 65 days.

(21) Appl. No.: 14/241,859

(22) PCT Filed: Aug. 24, 2012

(86) PCT No.: PCT/JP2012/071374
§ 371 (c)(1),
(2), (4) Date: Feb. 27, 2014

(87) PCT Pub. No.: WO2013/031660
PCT Pub. Date: Mar. 7, 2013

(65) Prior Publication Data
US 2014/0212249 A1    Jul. 31, 2014

(30) Foreign Application Priority Data
Aug. 31, 2011   (JP) .................................. 2011-188146

(51) Int. Cl.
*B65G 1/04*      (2006.01)

(52) U.S. Cl.
CPC ............ *B65G 1/0492* (2013.01); *B65G 1/0407* (2013.01); *B65G 1/0435* (2013.01)

(58) Field of Classification Search
CPC .. B65G 1/0407; B65G 1/0492; B65G 1/0435; B65G 1/04; B65G 1/0485; B65G 1/0442; B65G 1/0414; B65G 1/0428; B65G 1/0478; B65G 1/06; B65G 1/023; B65G 1/065; B66F 9/07; B66F 9/141; H01L 21/67769
See application file for complete search history.

(56) References Cited

U.S. PATENT DOCUMENTS 3,462,006 A     8/1969   Scott
5,060,211 A *  10/1991   Blanding .................. 369/30.45
(Continued)

FOREIGN PATENT DOCUMENTS

DE     200 19 591 U1    5/2001
FR     1 231 535 A      9/1960
(Continued)

OTHER PUBLICATIONS

International Search Report mailed Oct. 16, 2012, for corresponding International Application No. PCT/JP2012/071374, 4 pages.
(Continued)

*Primary Examiner* — Glenn Myers
(74) *Attorney, Agent, or Firm* — Seed IP Law Group PLLC

(57) ABSTRACT

An automated warehouse system may require less space than conventional warehouse systems. The automated warehouse system is configured so that loads are stored in storage areas formed by vertically extending support pillars and horizontally extending beams. The loads are loaded into the storage areas, and the loads are unloaded from storage areas. The automated warehouse system comprises: vertical guide rails disposed on the support pillars; horizontal guide rails disposed on the beams; and a movable platform having a frame body and guide rollers, at least part of the frame body having the same rectangular shape as a shape of at least part of at least one of the storage areas and having vertical frame members and horizontal frame members, the guide rollers being disposed on the vertical frame members and engaging the vertical guide rails or disposed on the horizontal frame members and engaging the horizontal guide rails.

20 Claims, 12 Drawing Sheets

(56) References Cited

U.S. PATENT DOCUMENTS

| | | | |
|---|---|---|---|
| 5,190,427 A | 3/1993 | Lai | |
| 7,381,022 B1* | 6/2008 | King | 414/267 |
| 2005/0047895 A1* | 3/2005 | Lert, Jr. | 414/273 |
| 2008/0131241 A1* | 6/2008 | King | 414/267 |
| 2008/0279669 A1* | 11/2008 | Hanel | 414/660 |
| 2011/0255940 A1* | 10/2011 | Wildfeuer | 414/267 |

FOREIGN PATENT DOCUMENTS

| | | |
|---|---|---|
| JP | 60148704 U | 10/1985 |
| JP | 02139804 U | 11/1990 |
| JP | 11301816 A | 11/1999 |
| JP | 11310306 A | 11/1999 |
| JP | 2000034003 A | 2/2000 |
| JP | 2008100848 A | 5/2008 |

OTHER PUBLICATIONS

Extended European Search Report dated Jun. 23, 2015, for corresponding EP Application No. 11875416.7-1708 / 2776325, 5 pages.

* cited by examiner

AUTOMATED WAREHOUSE SYSTEM

BACKGROUND

1. Technical Field

The present disclosure generally relates to an automated warehouse system, and, in particular, relates to an automated warehouse system that transfers loads stored in storage areas.

2. Description of the Related Art

Conventional automated warehouse systems typically use a load elevator-type of stacker cranes as a transfer means. These stacker cranes are driven along travel guide rails, and are structured so as to move up and down along a guide frame portion that is disposed perpendicularly in relation to the travel guide rails. To enable these stacker cranes to move in relation to a plurality of storage areas that are arranged in a line, the travel guide rails are laid, from end to end, along the storage areas that are arranged in a line. An automated storage system that uses such a stacker crane requires a large amount of space. Moreover, often it is possible to provide only a single stacker crane for a single travel guide rail. In automated warehouse systems there is a need to save space and to make the systems more compact, and it is desirable that the size, including the stacker crane and the plurality of storage areas, be small.

For example, Japanese Unexamined Patent Application Publication 2008-100848 discloses an automatic storage system that attempts to efficiently store and transport items.

However, when a load elevator-type of stacker crane is used as a transfer means in an automated warehouse system, it is necessary to provide movement rails for the stacker crane, which limits the ability to reduce space in a warehouse. Moreover, when a plurality of stacker cranes is provided due to a high demand for transferring loads, it becomes necessary to provide other movement rails as well, making space reduction difficult.

BRIEF SUMMARY

The present disclosure overcomes one or more of the above-identified problems associated with conventional automated warehouse systems and advantageously provides a space-saving automated warehouse system.

An automated warehouse system according to a first aspect of the present disclosure stores loads in a plurality of storage areas formed from a plurality of support pillars that extend in the vertical direction and a plurality of beams that extend in the horizontal direction, transfers the loads to the plurality of storage areas, and transfers the loads from the plurality of storage areas. The automated warehouse system is provided with a movable platform having a frame body that has a vertical frame and a horizontal frame, at least part of the frame body having a rectangular shape that is the same as a shape of at least part of at least one of said storage areas, and a guide roller that engages a vertical guide rail that is disposed adjacent the vertical frame or a horizontal guide rail that is disposed adjacent the horizontal frame. Because the movable platform advances along the vertical guide rail and the horizontal guide rail, there is no need to provide travel guide rails for a stacker crane on the floor. Moreover, this also enables a plurality of movable platforms to be provided on the vertical guide rail and the horizontal guide rail.

In an automated warehouse system according to a second aspect of the present disclosure, the movable platform has a picker configured to slide the loads to transfer the loads from the movable platform into the storage areas, and to slide the load to transfer the loads out of the storage areas into the movable platform.

In an automated warehouse system according to a third aspect of the present disclosure, the guide roller is disposed at a corner portion of the frame body, and is movable in a direction that is perpendicular to the vertical guide rail and the horizontal guide rail; and when the loads are transferred into or transferred out of the movable platform, the guide roller is moved into contact with the vertical guide rail or the horizontal guide rail. This causes the movable platform to be secured with respect to at least one of the storage areas.

An automated warehouse system according to a fourth aspect of the present disclosure has a locking device configured to lock the horizontal guide rail and the movable platform together when transferring the loads into or transferring the loads out of the movable platform. This causes the movable platform to be secured with respect to at least one of the storage areas.

In an automated warehouse system according to a fifth aspect of the present disclosure, the guide roller is movable along an edge of the frame body in the horizontal direction to a corner portion of the frame body; wherein, when the movable platform is moved in the horizontal direction to transfer loads into or out of the movable platform, the guide roller is located at a center region of the edge in the horizontal direction, and when the movable platform is moved in the vertical direction to transfer the loads into or out of the movable platform, the guide roller is located at the corner portion of the frame body.

In an automated warehouse system according to a sixth aspect of the present disclosure, the guide roller includes a first guide roller and a second guide roller, where a movement distance of the first guide roller from the center region of the edge of the frame body to the corner portion of the frame body and a movement distance of the second guide roller from a center region of another edge of the frame body in the horizontal direction to a corner portion of the frame body are different.

In an automated warehouse system according to a seventh aspect of the present disclosure, the movable platform is disposed between a first storage shelf that includes a plurality of storage areas, and a second storage shelf that includes a plurality of storage areas and that is disposed so as to face the first storage shelf, and a first guide roller is disposed on a first side of the movable platform that faces the first storage shelf and a second guide roller is disposed on a second side of the movable platform that faces the second storage shelf.

In an automated warehouse system according to an eighth aspect of the present disclosure, the movable platform is disposed between a third storage shelf that includes a plurality of storage areas, and a fourth storage shelf that includes a plurality of storage areas and that is disposed so as to face the third storage shelf, and the second storage shelf adjoins the third storage shelf.

In an automated warehouse system according to a ninth aspect of the present disclosure, the frame body of the movable platform corresponds to a plurality of adjoining storage areas.

An automated warehouse system according to the present disclosure enables transferring of loads into a plurality of storage areas, and transferring of loads from the storage areas, with a small floor space.

BRIEF DESCRIPTION OF THE SEVERAL VIEWS OF THE DRAWINGS

FIG. 2 (B) is a side view diagram, viewed from the X direction, of a pair of storage shelves 100.

FIG. 5 (B) is a side view diagram, viewed from the X direction, illustrating relationships among the guide roller 52, the locking pin 58, and the guide rail 110 that is formed on the beam 105.

FIG. 5 (C) is a side view diagram, viewed from the Z direction, illustrating relationships among the guide roller 52, the locking pin 58, and the guide rail 110 that is formed on the beam 105.

FIG. 5 (D) is a side view diagram, viewed from the X direction, illustrating relationships among the guide roller 52, the locking pin 58, and the guide rail 110 that is formed on the beam 105.

DETAILED DESCRIPTION

First Embodiment

Figure 1:
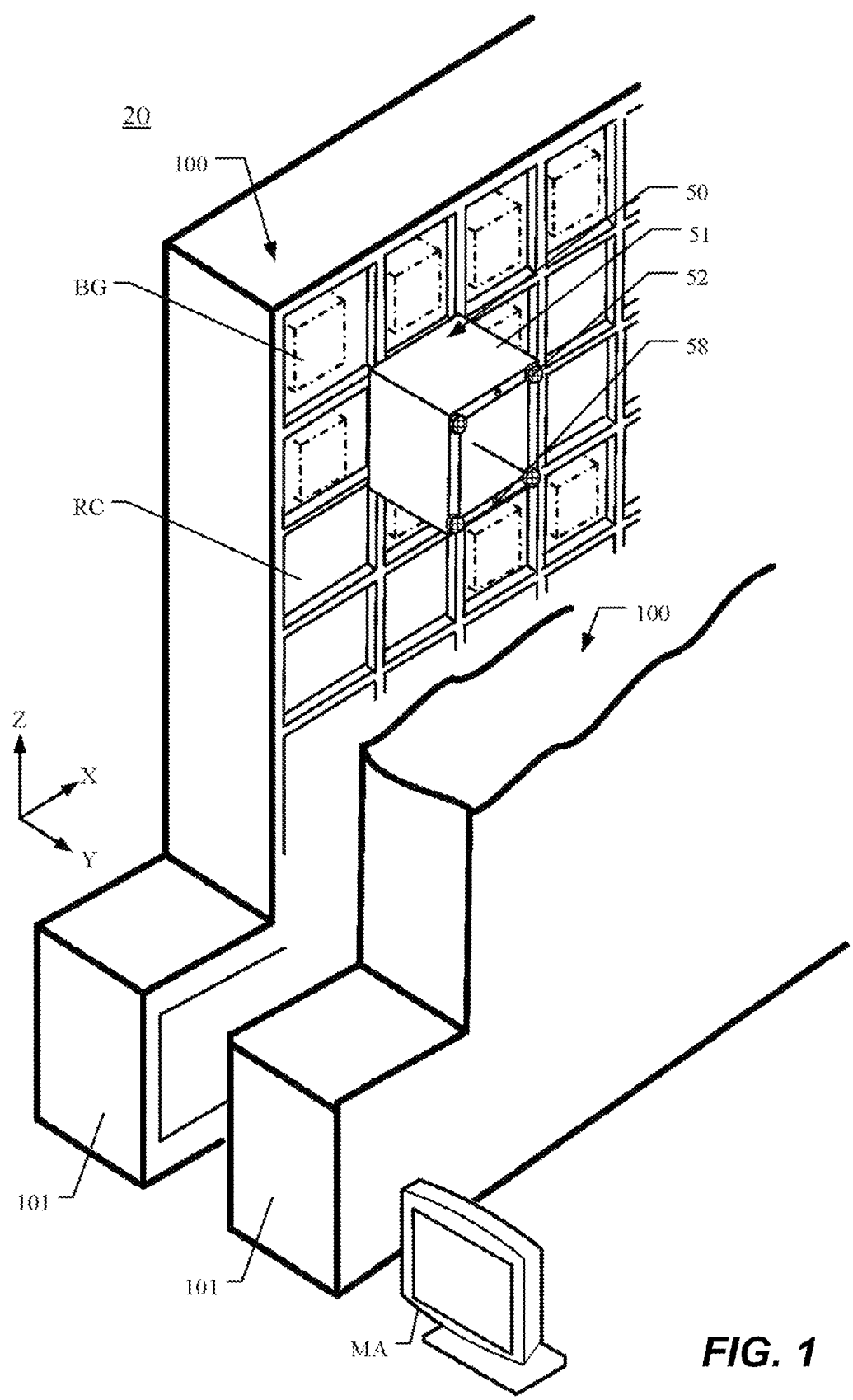
FIG. 1 is a perspective view diagram of an automated warehouse system 20 according to a first embodiment of the present disclosure.

A first embodiment will be explained below based on the appended drawings. An overall perspective diagram of an automated warehouse system 20 according to the first embodiment is illustrated in FIG. 1. To facilitate viewing of the movable platform 50, the drawing omits a portion of one of the storage shelves 100.

Structure of the Automated Warehouse System 20

As illustrated in FIG. 1, the automated warehouse system 20 according to the first embodiment has a pair of storage shelves 100 having a plurality of storage areas RC. The storage shelves 100 have storage areas RC wherein loads BG are stored, and storage areas RC wherein loads BG are not yet stored. The movable platform 50 transfers a load BG from a loading/unloading port 101 (shown in FIG. 2 (A)) to a specific storage area RC, or transfers a load BG that is stored in a storage area RC to the loading/unloading port 101, following a movement instruction from a controlling portion MA.

Figure 2:
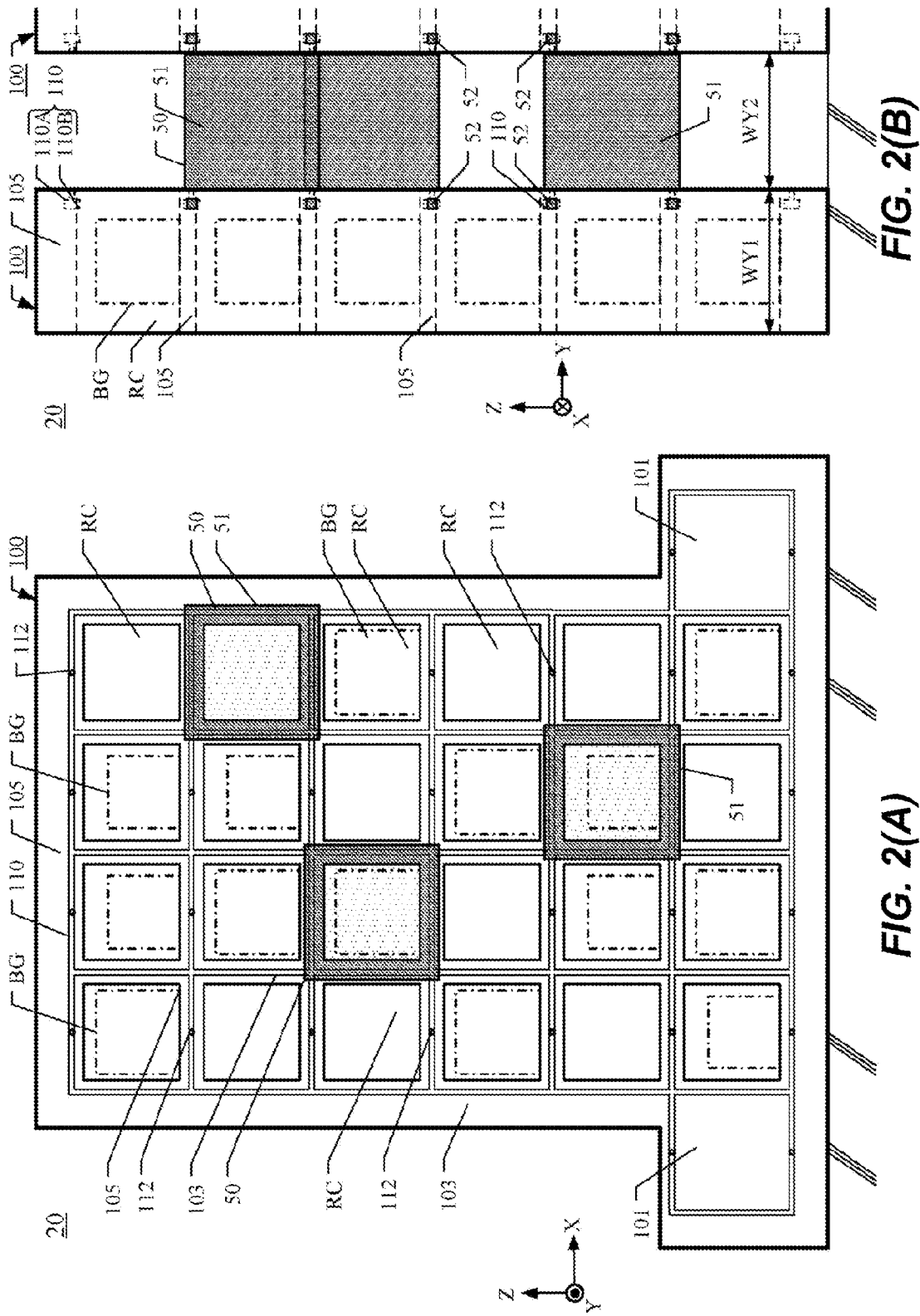
FIG. 2 (A) is a side view diagram, viewed from the Y direction, a storage shelf 100.

FIG. 2 (A) is a side view diagram, viewed from the Y direction, of one of the pair of storage shelves 100, and FIG. 2 (B) is a side view diagram, viewed from the X direction, of the pair of storage shelves 100.

As illustrated in FIG. 2 (A), the storage shelf 100 is built from a plurality of support pillars 103 that extend in the vertical or Z direction and a plurality of beams 105 that extend in the horizontal or X direction. A plurality of storage areas RC is formed from these support pillars 103 and beams 105. The number of levels and number of columns of storage areas RC are arbitrary, and may be increased or decreased as appropriate depending on an installation space. Loading/unloading ports 101, for transferring loads BG to the movable platform 50 or transferring loads BG from the movable platform 50, are provided on the left and right of the storage shelf 100 at the bottommost level (on the −Z side).

Figure 3:
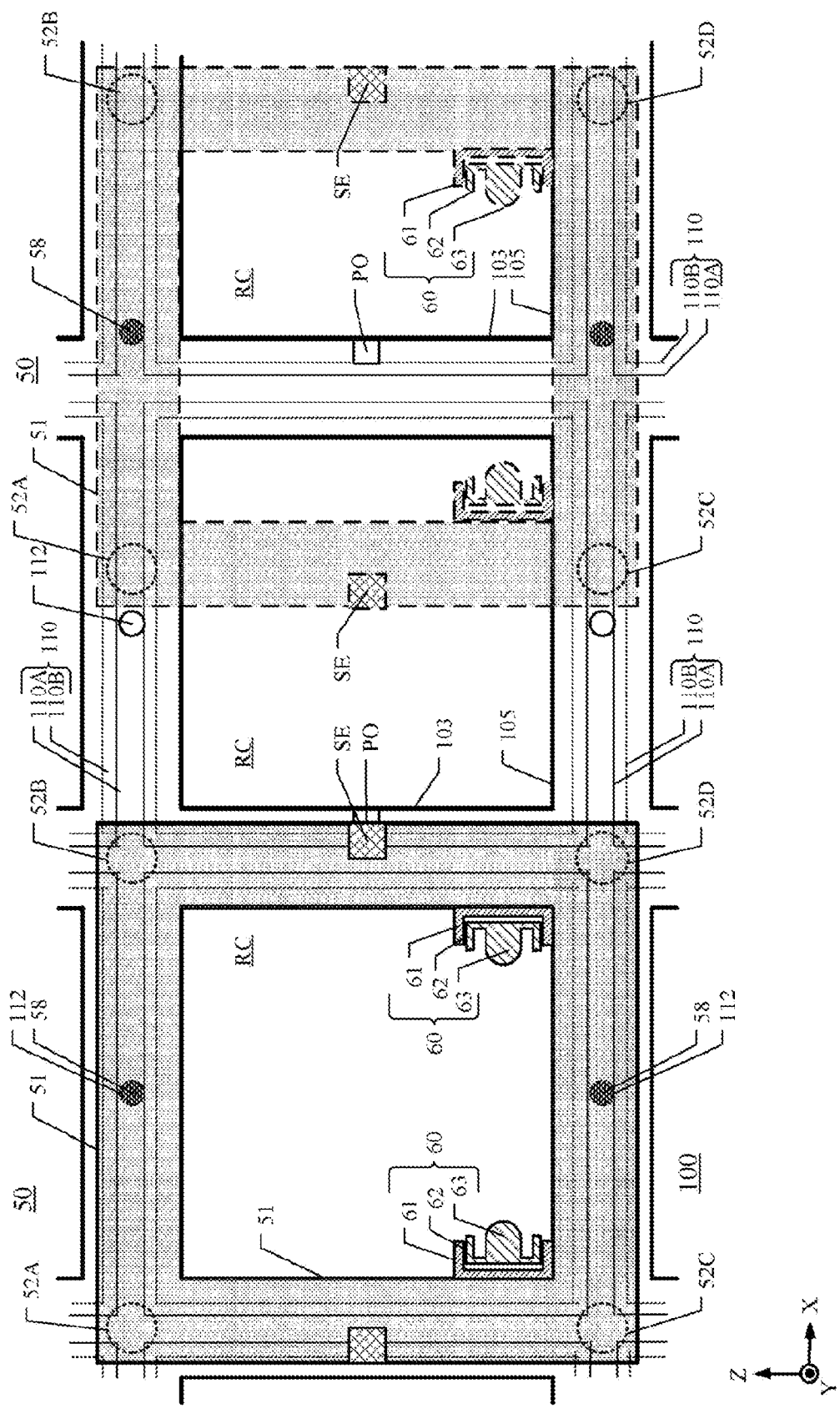
FIG. 3 is an enlarged side view diagram, viewed from the Y direction, of the storage shelf 100 and a movable platform 50.

Guide rails 110 that extend in the vertical and horizontal directions are disposed on the support pillars 103 and beams 105, respectively. The guide rails 110 have shaft rails 110A, of a narrow width, that are disposed on the outside of the individual storage areas RC, and roller rails 110B, of a wide width, that are disposed on the insides of the individual storage areas RC (as shown in FIG. 3). The guide rollers 52 of the movable platform 50 are disposed within the roller rails 110B. A plurality of locking holes 112 is formed in the guide rails 110 that extend horizontally. As illustrated in FIG. 2 (A), the locking holes 112 are formed at the top and bottom of each individual storage area RC near the center of the storage area RC in the X direction.

As illustrated in FIGS. 2 (A) and 2 (B), the movable platform 50 is of a size that essentially matches the size of the storage area RC (in the XZ plane). The movable platform 50 has a frame body 51. At least one face of the frame body 51 in the Y direction is open so as to enable the load BG to be transferred in and out of the movable platform 50. Moreover, eight guide rollers 52 are provided for a single frame body 51. In order to be supported from the pair of storage shelves 100, four guide rollers 52 are disposed in the −Y direction from the frame body 51 (where two guide rollers 52 are illustrated in FIG. 2 (B)), and four guide rollers 52 are disposed in the +Y direction from the frame body 51 (where two guide rollers 52 are illustrated in FIG. 2 (B)). These eight guide rollers 52 are located within the roller rails 110B of the guide rails 110. The diameter of each of the guide rollers 52 is larger than the width of each of the shaft rails 110A, and thus the guide rollers 52 do not fall out of the guide rails 110 (as shown in FIG. 3). Moreover, because the size of the load BG that is transferred by the movable platform 50 is the same as the size of the load BG that is stored in the storage area RC, the width WY1 of the storage shelf 100 in the Y direction is essentially the same as the width WY2 of the movable platform 50 in the Y direction.

As illustrated in FIGS. 2 (A) and 2 (B), a plurality of movable platforms 50 is disposed on the storage shelf 100. In a conventional automated warehouse system, typically only a single stacker crane is provided for a single travel guide rail. Because of this, the only way to increase the efficiency with which the loads BG are transferred is to increase the speed of the stacker crane itself. However, in the present embodiment, a plurality of movable platforms 50 can be provided on the storage shelf 100. Because of this, the number of movable platforms 50 can be adjusted depending on the frequency with which the loads BG are transferred.

Configuration of the Guide Rollers 52 and Locking Pins 58

Figure 4:
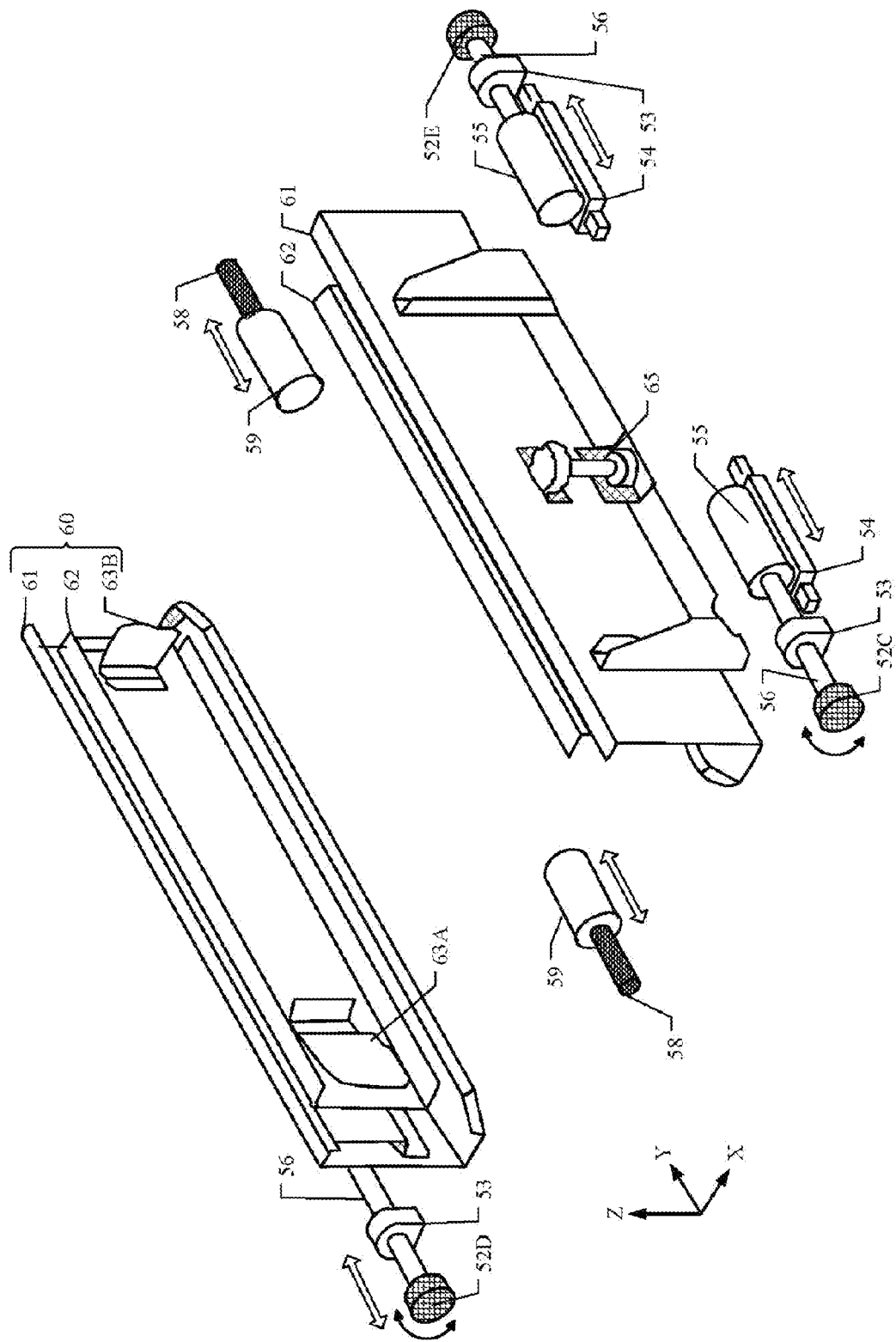
FIG. 4 is a perspective view diagram illustrating a guide roller 52, a locking pin 58, and a picker 60.

FIG. 3 is an enlarged side view diagram, viewed from the Y direction, of the storage shelf 100 and the movable platform 50. Moreover, FIG. 4 is a diagram illustrating the guide rollers 52 (52C, 52D, and 52E), the locking pin 58, and the picker 60, and the like, provided on the movable platform 50. In FIG. 4, the frame body 51 of the movable platform 50 is not shown, to facilitate viewing of the guide rollers 52.

In FIG. 3, the movable platform 50 that is illustrated with dotted lines is shown in a state wherein it is in motion from one storage area RC to another storage area RC, and the movable platform 50 that is illustrated with solid lines is shown in a state wherein it can transfer a load out of or into a single storage area RC. The guide rollers 52 are driven by at least one driving motor 55 (shown in FIG. 4) based on at least one instruction from the controlling portion MA (shown in FIG. 1).

The movable platform 50 has a location sensor SE at the Z-direction center of the left and right edges of the frame interior 51. Location indicators PO, which are subject to location detection by the location sensor SE, are disposed on the support pillars 103. When the location sensor SE and the location indicator PO coincide, the movable platform 50 is at a storage area RC, at a location wherein the load BG can be transferred into or out of the movable platform 50.

In the movable platform 50, a pair of pickers 60 is disposed on the inside of the frame interior 51. The pair of pickers 60 transfers a load BG from the frame interior 51 into the storage area RC, and transfers the load BG out of the storage area RC to the frame interior 51.

As illustrated in FIG. 4, the picker 60 has a stationary frame 61 and a movable frame 62. The movable frame 62 is moved by a picker driving portion 65, such as a motor that is built into the stationary frame 61. The picker driving portion 65 moves the movable frame 62 in the ±Y directions.

Each of a pair of movable frames 62 has respective pawl members 63 (63A and 63B). In FIG. 4, in one of the movable frames 62, the pawl member 63A is illustrated in a laid-flat state and the pawl member 63B is illustrated in an erect state. The pawl members 63 (63A and 63B) are formed in L shapes, in a plan view, where the pawl members 63 are attached so as to be able to pivot relative to a support shaft (not shown) that is provided on the movable frame 62. A driving portion, not shown, switches the pawl members 63 between the erect state in the X direction and the laid-flat state.

In a state wherein a load BG has been placed on the movable platform 50, a pair of pawl members 63B on the +Y side are erect in the X direction, and when, in this state, the movable frame 62 is driven in the −Y direction, and the pawl members 63B push the load BG in the −Y direction. This enables the picker 60 to transfer the load BG from the movable platform 50 to the storage area RC. On the other hand, in a state wherein the movable frame 62 has advanced far in the −Y direction (relative to the storage area RC), the pawl members 63A are caused to be erect in the X direction, and when, in this state, the movable frame 62 returns in the +Y direction, and the pawl members 63B pull the load BG from the storage area RC into the movable platform 50.

Returning to FIG. 3, the movable platform 50 has locking pins 58 in the X-direction centers of the top and bottom edges of the frame interior 51. Moreover, on the beams 105, locking holes 112 are formed in a center location for each storage area RC in the guide rails 110 that extend in the horizontal direction. A locking pin 58 can be inserted into a locking hole 112.

Moreover, as illustrated in FIG. 4, an actuator 59, such as an electromagnetic solenoid, is attached to the locking pin 58. The locking pin 58 is moved in the ±Y directions by the actuator 59.

Returning again to FIG. 3, the guide rollers 52 (52A through 52D) are disposed at four corners of the frame body 51 in the XZ plane. In the movable platform 50 that is illustrated with the solid lines, the four guide rollers 52A through 52D are located at the points of intersection between the guide rails 110 that extend in the vertical direction and the guide rails 110 that extend in the horizontal direction. As illustrated in FIG. 2 (B), because the movable platform 50 is held between the pair of storage shelves 100, a total of eight guide rollers 52 are disposed at the corners of the frame body 51. Because of this, the movable platform 50 can move in both the Z direction and the X direction. When moving in the ±Z directions, the two guide rollers 52A and 52C rotate in the clockwise direction, and the two guide rollers 52B and 52D rotate in the counterclockwise direction. When moving in the +X direction, the four guide rollers 52A through 52D rotate in the clockwise direction. When moving in the −X direction, the four guide rollers 52A through 52D rotate in the counterclockwise direction.

Moreover, as illustrated in FIG. 4, the guide rollers 52 are connected to rotating shafts 56 of driving motors 55. The rotating shafts 56 are supported by thrust bearings 53. By rotating the driving motors 55, the guide rollers 52 rotate in the clockwise direction or the counterclockwise direction, as indicated by the rotation arrows. Moreover, each driving motor 55 is mounted on a Y-axis movable table 54. The Y-axis movable table 54 can be moved in the ±Y directions by driving means, not shown. Because of this, the driving motors 55 can be moved in the ±Y directions and the rotating shafts 56 can also be moved in the ±Y directions by the thrust bearings 53. That is, the guide rollers 52 can be moved in the ±Y directions.

Note that the movable platform 50, as illustrated in FIG. 2 (B) is held between the pair of storage shelves 100. Both guide rollers 52C and 52E can be moved in the ±Y direction by Y-axis movable tables 54 on both storage shelf 100 sides. Moreover, the controlling portion MA is able to vary the speed of rotation of the driving motors 55 and thus is able to vary the speed of rotation of the guide rollers 52 by varying driving pulses or electric current. Because of this, the controlling portion MA (shown in FIG. 1) is able to vary the movement speed of the movable platform 50.

Operation of the Guide Rollers 52 and the Locking Pins 58

Figure 5:
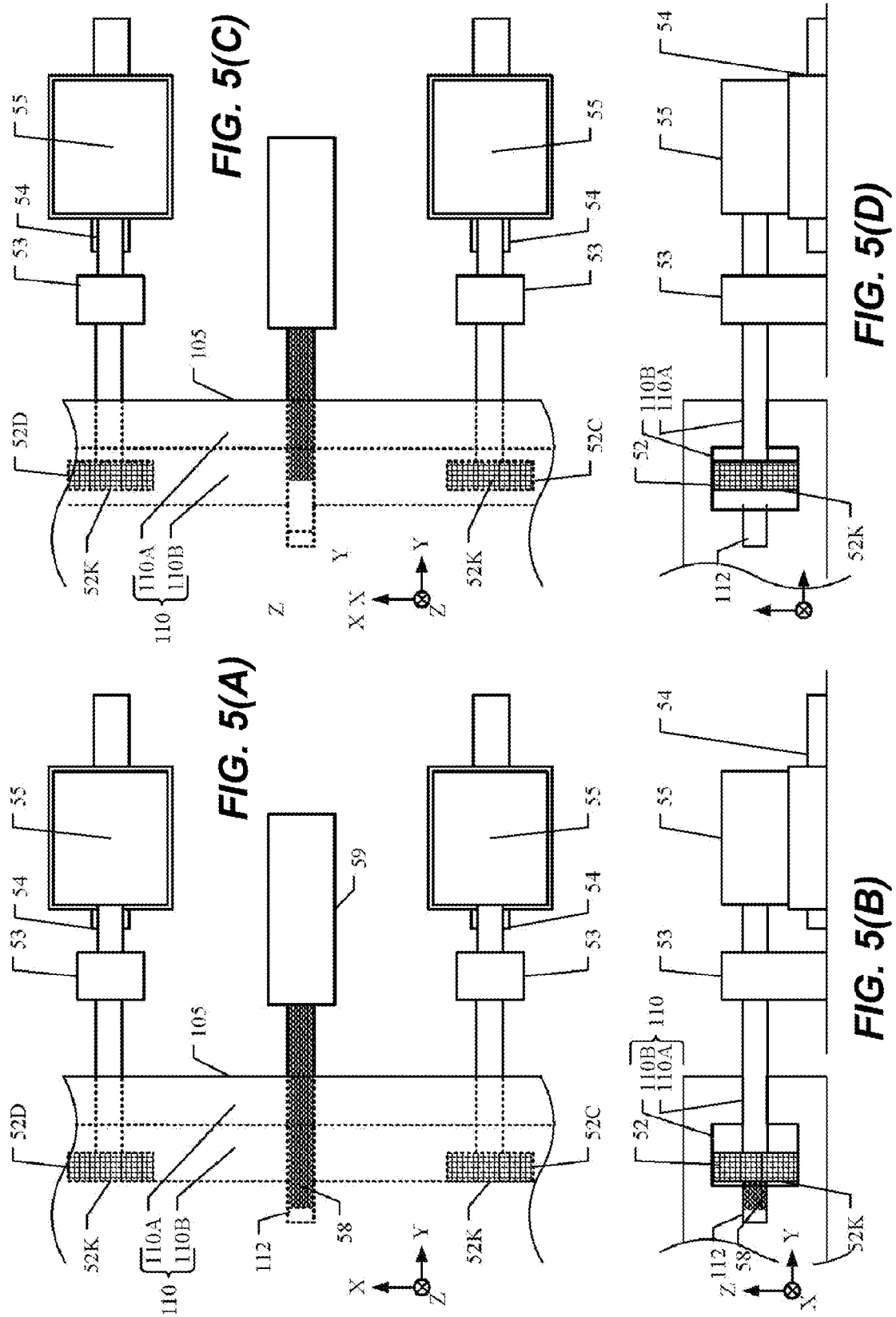
FIG. 5 (A) is a side view diagram, viewed from the Z direction, illustrating relationships among the guide roller 52, the locking pin 58, and a guide rail 110 that is formed on a beam 105.

FIG. 5 will be used next to explain the operation of the guide rollers 52 and the locking pins 58. In FIG. 3, when the movable platform 50 that is indicated by the solid line transfers a load into or out of a storage area RC, if no rotational forces are applied to the guide rollers 52, then there would be a danger that the movable platform 50 would fall in the −Z direction under its own weight. Continuously applying rotational forces to the guide rollers 52 would place a large load on the driving motors 55. Given this, the movable platform 50 is supported by the guide rollers 52 and the locking pins 58 so that the movable platform 50 will be maintained in the location illustrated by the solid lines, even if the driving motors 55 are stopped.

FIGS. 5 (A) to 5(D) illustrate relationships among the guide rollers 52 (52C and 52D), the locking pins 58, and the guide rails 110 that are formed on the beams 105. FIGS. 5 (A) and (B) illustrate a state wherein a side face 52K on the Y side of the guide roller 52 is in contact with the roller rail 110B, and the locking pin 58 is inserted in a locking hole 112. Note that, FIG. 5 (A) is a view when seen from the Z direction, and FIG. 5 (B) is a view when seen from the X direction. FIGS. 5 (C) and 5 (D) show a state wherein the guide rollers 52 are located in the Y-direction center of the roller rails 110B, and the locking pins 58 have been removed from the locking holes 112. Note that, FIG. 5 (C) is a view when seen from the Z direction, and FIG. 5 (D) is a view when seen from the X direction.

As illustrated in FIGS. 5 (A) and 5 (B), when the movable platform 50 is at the location illustrated by the solid lines in FIG. 3, the Y-axis movable tables 54 move the guide rollers 52 in the −Y direction. Following this, the side faces 52K of the guide rollers 52 make contact with the roller rail 110B. The Y-axis movable tables 54 on the side of the other storage shelf 100, not shown, move the guide rollers 52 (such as the guide roller 52E of FIG. 4) in the +Y direction. Because of this, the four guide rollers 52 on the side of one of the storage shelves 100 (where, in FIG. 5 (A), the guide rollers 52C and 52D are illustrated) move in the −Y direction, and the four guide rollers 52 on the side of the other storage shelf 100 move in the +Y direction, to secure the movable platform 50 at the location shown by the solid line.

Moreover, when the movable platform 50 is at the location indicated by the solid lines in FIG. 3, the locking pins 58 are moved in the −Y direction by actuators 59 on the side of one of the storage shelves 100. The locking pins 58 are moved in the +Y direction by actuators 59 on the side of the other storage shelf 100. The respective locking pins 58 are inserted into the locking holes 112 in the guide rails 110. Because of this, the movable platform 50 is locked at the location indicated by the solid lines.

As illustrated in FIGS. 5 (C) and 5 (D), when the movable platform 50 is at the location shown by the dotted lines in FIG. 3 (that is, a location other than the location indicated by the solid lines), the guide rollers 52 are in locations that do not make contact with the roller rails 110B. The eight guide rollers 52 support the movable platform 50 in the Z direction in the roller rails 110B that extend in the horizontal direction of the beams 105. Note that the locking pins 58 are removed from the locking holes 112 of the guide rails 110.

Operation of the Automated Warehouse System 20

Figure 6:
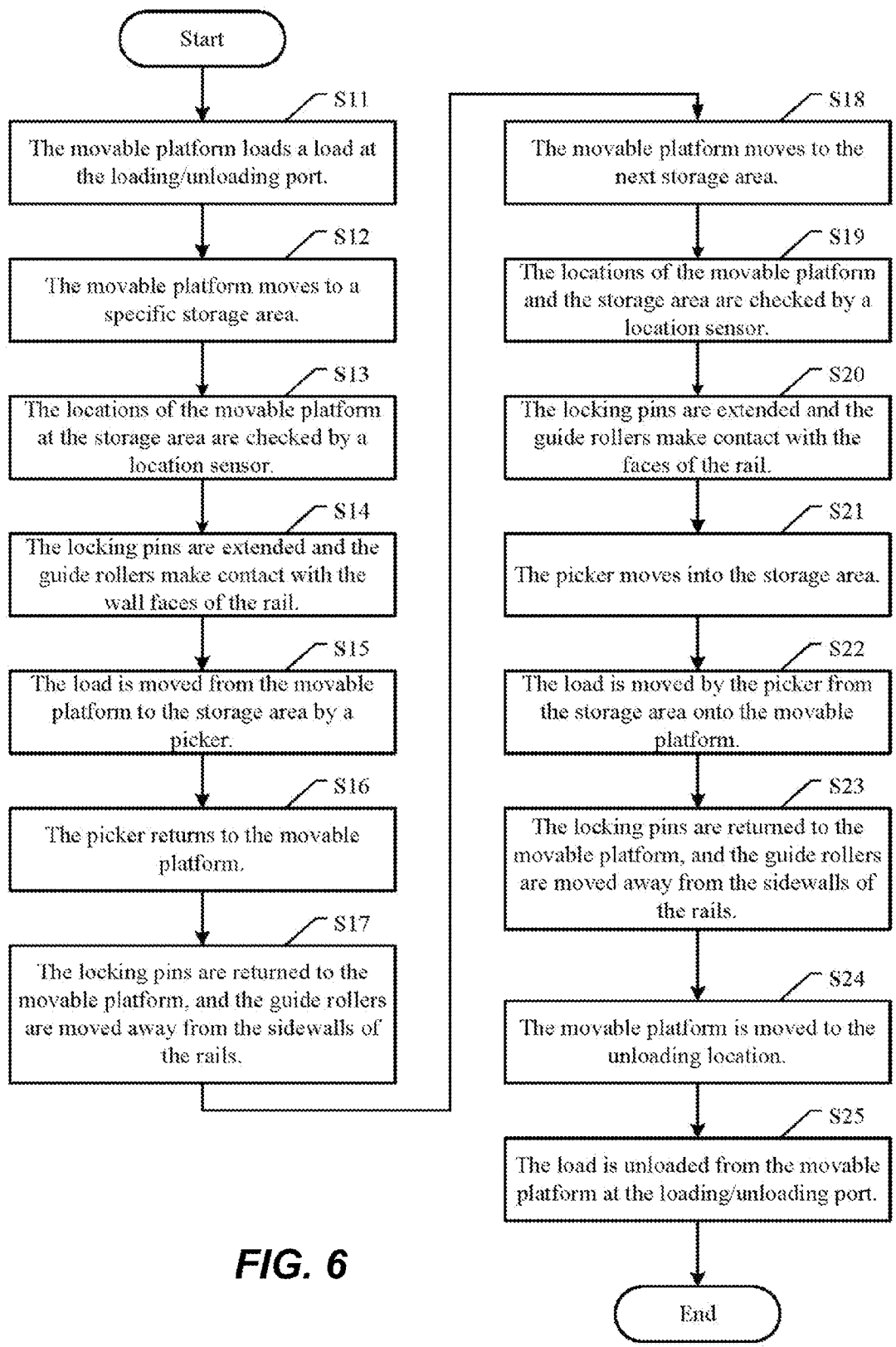
FIG. 6 is a flowchart illustrating a process for transferring loads BG using the automated warehouse system 20.

FIG. 6 is a flowchart illustrating a process for transferring a load BG into or out of storage by the automated warehouse system 20. An operation wherein a single movable platform 50 transfers a load BG to a storage area RC and transfers another load BG from a storage area RC will be explained using this flowchart.

In Step S11, the movable platform 50 transfers a load BG from the loading/unloading port 101 (shown in FIG. 2 (A)) into the frame body 51 of the movable platform 50.

In Step S12, the guide rollers 52 are rotated in accordance with at least one instruction from the controlling portion MA to move the movable platform 50 to a specific storage area RC. At the time of this movement, the location sensor SE detects the location indicators PO. When the location sensor SE has confirmed the location indicator PO, it sends a signal to the controlling portion MA, and the controlling portion MA confirms the location of the movable platform 50 during movement.

In Step S13, the controlling portion MA is sent a signal from the location sensor SE, and checks whether or not the movable platform 50 is moving correctly to the specific storage area RC. With the location sensor SE and the location indicator PO facing each other, the controlling portion MA confirms that the movable platform 50 is at a location at the storage area RC wherein the load BG can be moved out.

In Step S14, the controlling portion MA instructs the actuators 59 to cause the two locking pins 58 to extend. The locking pins 58 are inserted into the locking holes 112 of the guide rails 110. Following this, the controlling portion MA moves four guide rollers 52 in the +Y direction and the other four guide rollers 52 in the −Y direction, to cause the side faces 52K of the guide rollers 52 to make contact with the wall faces within the roller rails 110B. Doing so causes the movable platform 50 to be in a state wherein it is secured relative to the storage area RC.

In Step S15, the pickers 60 insert the load BG into the storage area RC from the frame body 51 of the movable platform 50.

In Step S16, the pickers 60 retract back into the movable platform 50 with the load BG still remaining within the storage area RC.

In Step S17, the locking pins 58, which had been extended, are returned to the frame body 51 side of the movable platform 50, so that the movable platform 50 can move to the next storage area RC. Similarly, the guide rollers 52 are moved in the Y direction to move the side faces 52K of the guide rollers 52 away from the roller rail 110B wall faces. The guide rollers 52 move to essentially the center of the roller rails 110B in the thickness or Y direction.

In Step S18, the guide rollers 52 are rotated by the driving motors 55 to move the movable platform 50 to the next storage area RC. During movement, the location sensor SE detects the location indicators PO. When the location sensor SE has confirmed a location indicator PO, it sends a signal to the controlling portion MA, and the controlling portion MA monitors the location of the movable platform 50 during movement.

In Step S19, the controlling portion MA checks, using the signal from the location sensor SE, whether or not the movable platform 50 has moved correctly to the next storage area RC.

In Step S20, the locking pins 58 are extended and the locking pins 58 are inserted into the locking holes 112. The guide rollers 52 are moved in the Y direction so that the side faces 52K thereof make contact with the wall faces within the roller rails 110B.

In Step S21, the pickers 60 are moved in the Y direction (or, more precisely, the movable frames 62 of the pickers 60 are moved relative to the stationary frames 61), to enter into the storage area RC. After this, the pawl members 63 are erected in the X direction.

In Step S22, the load BG is caught on the pawl members 63 of the pickers 60 and the load BG is transferred into the frame body 51 of the movable platform 50 from the storage area RC.

In Step S23, the locking pins 58 that had been protruding are returned to the frame body 51 side of the movable platform 50 so that the movable platform 50 can return to the loading/unloading port 101. Similarly, the guide rollers 52 are moved to essentially the center of the roller rails 110B in the thickness or Y direction.

In Step S24, the guide rollers 52 are rotated in accordance with at least one instruction from the controlling portion MA, and the movable platform 50 moves to the loading/unloading port 101.

In Step S25, the load BG is transferred out from the movable platform 50 into the loading/unloading port 101.

Configuration of Other Guide Rollers 152

The guide rollers 152, which will be explained next, are a modified example of the guide rollers 52.

Figure 7:
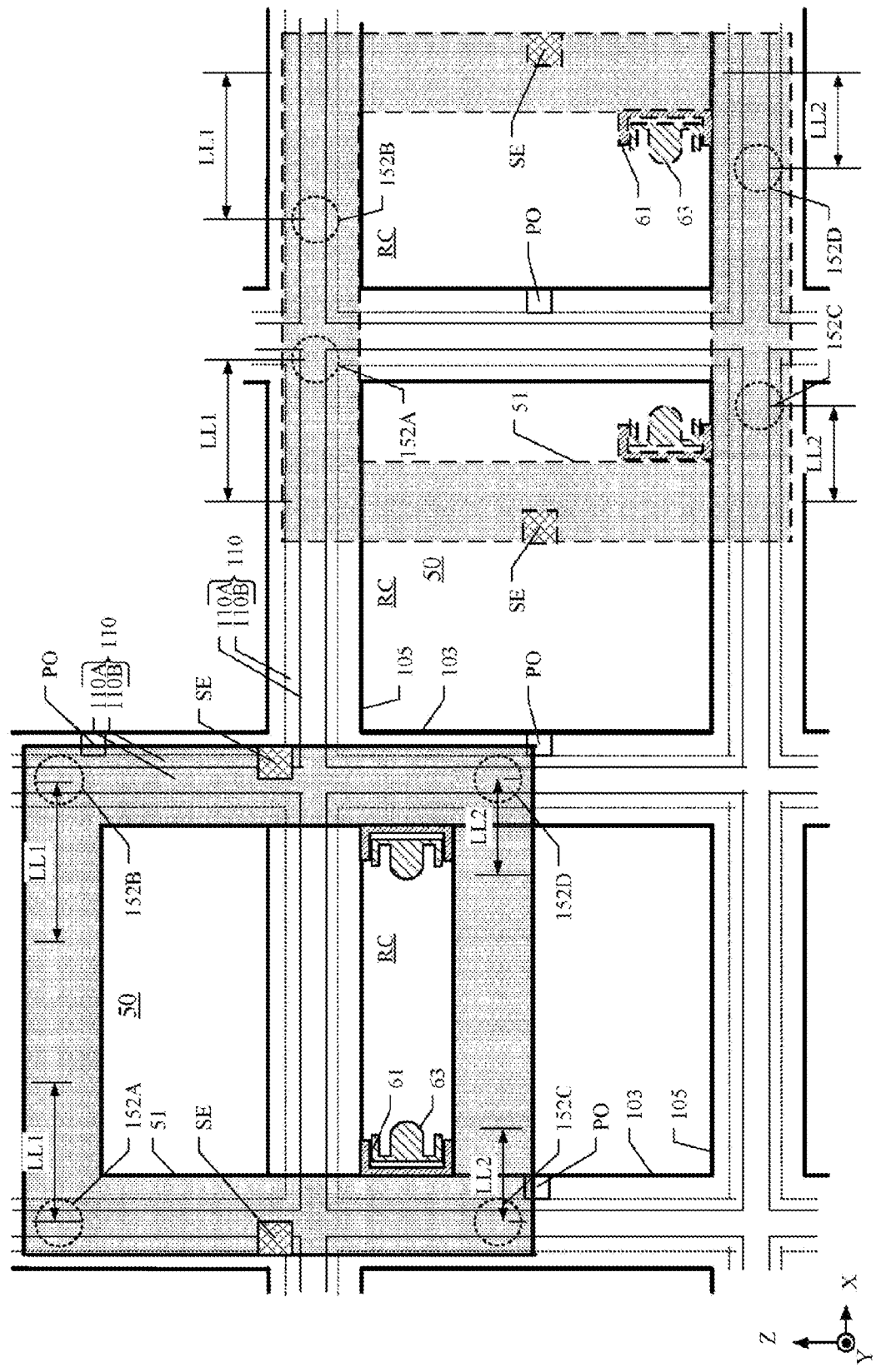
FIG. 7 is an enlarged side view diagram, viewed from the Y direction, of the movable platform 50.
Figure 8:
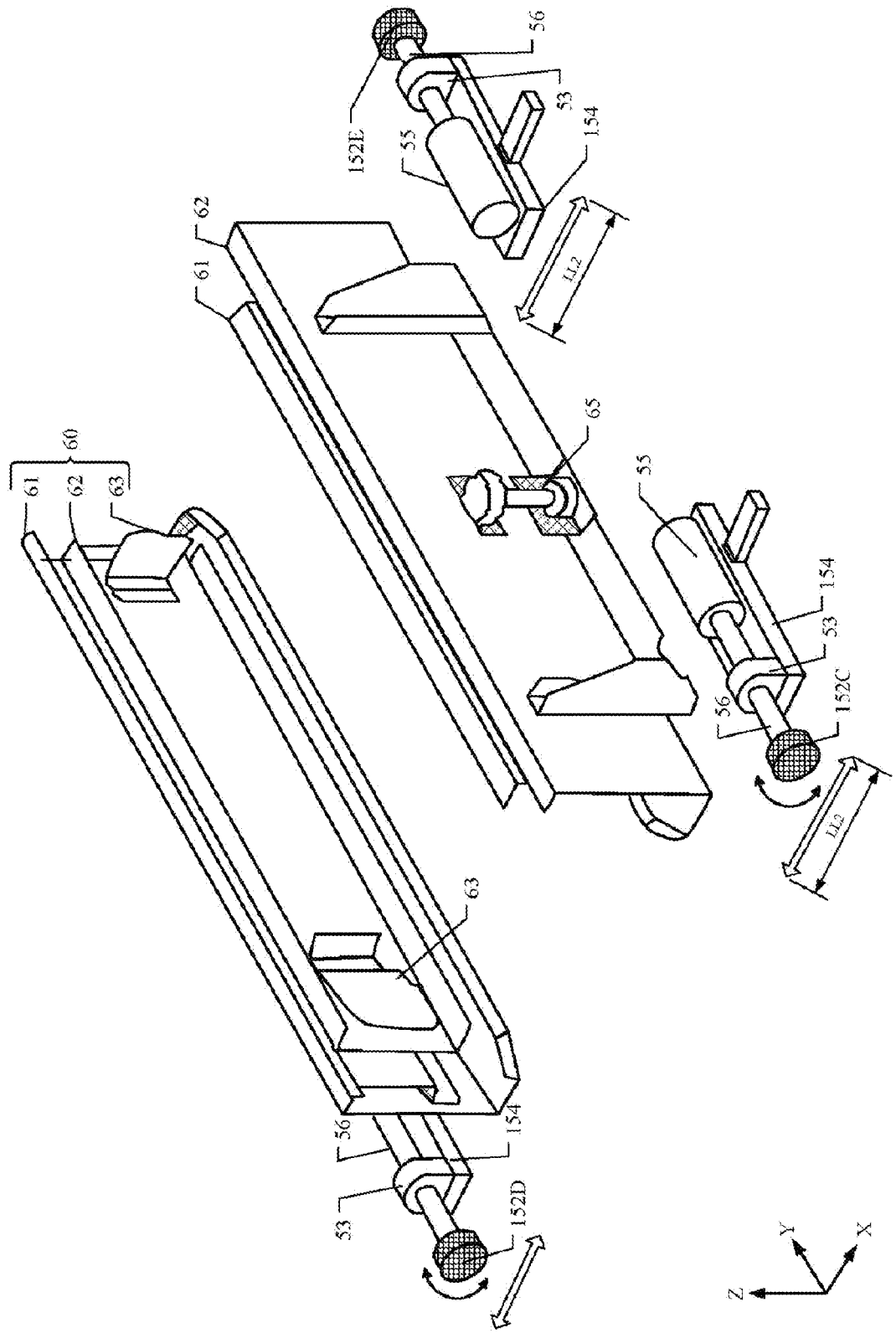
FIG. 8 is a perspective view diagram illustrating a guide roller 152 and the picker 60.

FIG. 7 is an enlarged side view diagram, viewed from the Y direction, of the storage shelf 100 and the movable platform 50. Moreover, FIG. 8 is a diagram illustrating the guide rollers 152 and the pickers 60, and the like, that are provided on the movable platform 50. In FIG. 8, the frame body 51 of the movable platform 50 is not illustrated, to facilitate viewing of the guide rollers 152. Moreover, the structure of the pickers 60 is identical to that which was explained using FIG. 5, so explanations thereof will be omitted.

In FIG. 7, the movable platform 50, indicated by the dotted lines, is drawn in a state wherein it is moving in the horizontal direction from one storage area RC to another storage area RC. The movable platform 50, indicated by the solid lines, is drawn in a state wherein it is moving in the vertical direction from one storage area RC to another storage area RC.

When the movable platform 50 is moved in the vertical direction, the guide rollers 152 (152A through 152D) are disposed at four corner portions of the frame body 51 in an XZ plane. As illustrated in FIG. 2 (B), the movable platform 50 is held between a pair of storage shelves 100, and thus a total of eight guide rollers 52 are disposed at the corner portions of the frame body 51. In this state, the movable platform 50 is able to move in the ±Z directions.

When the movable platform 50 is moved in the horizontal direction, or when the load BG is being transferred out from the movable platform 50 into a storage area RC, the guide rollers 152 (152A through 152D) are moved to the center region of the edge, in the horizontal direction, of the XZ plane. As illustrated in FIG. 7, the guide roller 152A moves a distance of LL1 in the +X direction, and the guide roller 152B moves a distance of LL1 in the −X direction. The guide roller 152C moves a distance of LL2 in the +X direction, and the guide roller 152D moves a distance of LL2 in the −X direction. The distances LL1 and LL2 are different. If the distances LL1 and LL2 were the same, when the two guide rollers 152A and 152C come to an intersection between the guide rails 110 that extend in the vertical direction and the guide rails 110 that extend in the horizontal direction, it would be necessary to support the movable platform 50 in the Z direction by the two guide rollers 152B and 152D (for a total of 4, including those on the side of the other storage shelf 100). When the distances LL1 and LL2 are different, the movable platform 50 can be supported in the Z direction by at least three rollers 152 (a total of six, including those on the side of the other storage shelf 100).

Note that when the load BG is moved out from the movable platform 50 into the storage area RC, the movable platform 50 is supported in the Z direction by eight guide rollers 152. Because of this, the locking pins 58 are not absolutely necessary.

As illustrated in FIG. 8, the guide rollers 152 are connected to the rotational shafts 56 of the driving motors 55. The rotational shafts 56 are supported by thrust bearings 53. The guide rollers 152 are rotated in the clockwise direction or the counterclockwise direction by the rotation of the driving motors 55. Moreover, the thrust bearings 53 and the driving motors 55 are mounted on X-axis movable tables 154. The X-axis movable tables 154 can be moved by a distance LL1 or a distance LL2 in the ±X directions by driving means, not shown. Because of this, the driving motors 55 are moved in the ±X directions, and the guide rollers 152 can be moved by a distance of LL1 or LL2 in the ±X directions. Note that, as illustrated in FIG. 2 (B), the movable platform 50 is held between the pair of storage shelves 100. The guide rollers 152 can be moved in the ±X directions, together with 152C and 152E, by the X-axis movable tables 154 on both storage shelf 100 sides.

Second Embodiment

Figure 9:
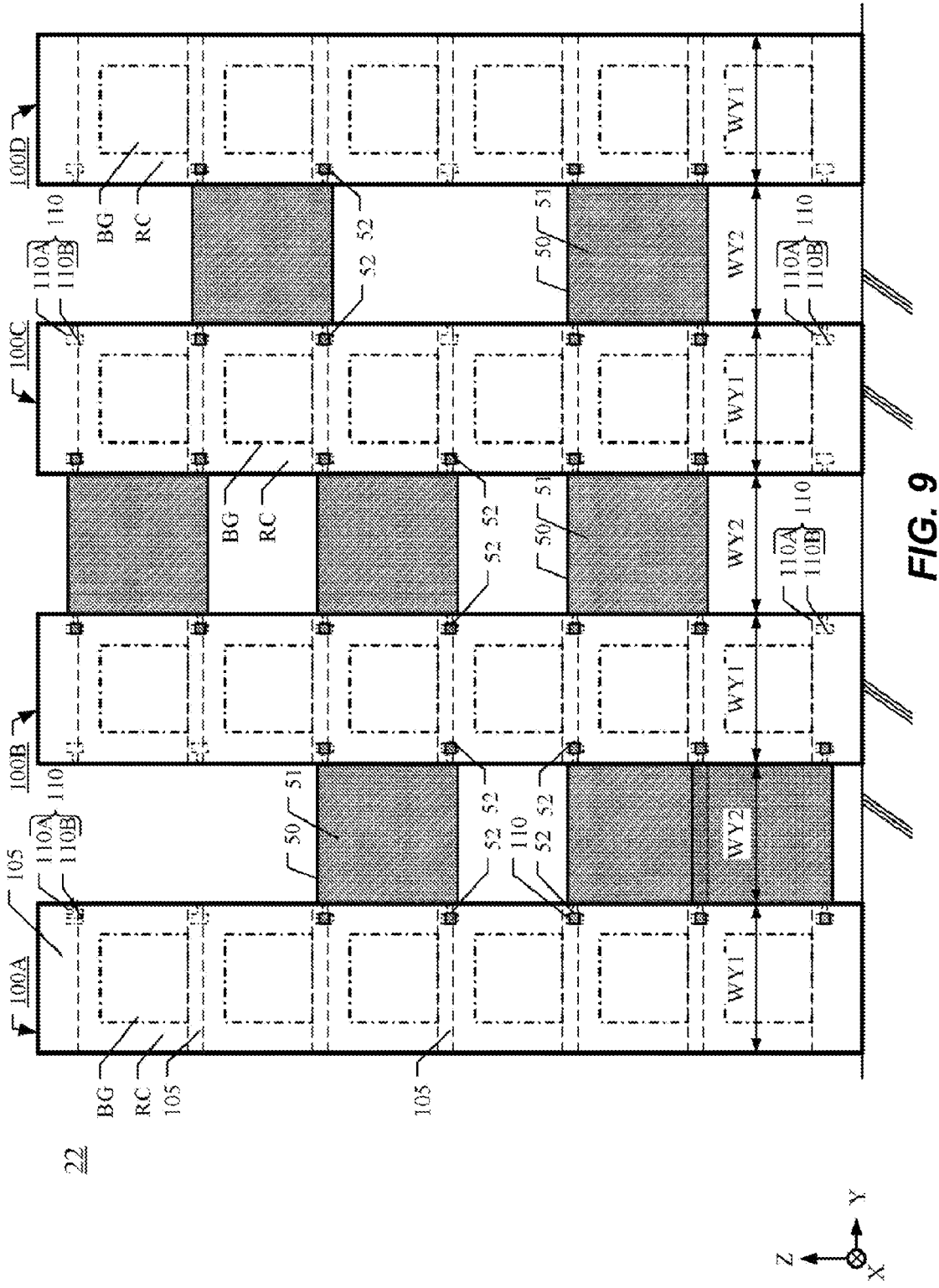
FIG. 9 is a side view diagram, viewed from the X direction illustrating an automated warehouse system 22 according to a second embodiment of the present disclosure.

An automated warehouse system 22 according to a second embodiment has a plurality of storage shelves 100 (100A through 100D). FIG. 9 is a side view diagram, viewed from the X direction, of the automated warehouse system 22.

The automated warehouse system 22 according to the second embodiment has four storage shelves 100 (100A through 100D), each having a plurality of storage areas RC. A plurality of movable platforms 50 is disposed between the storage shelves 100A and 100B. Similarly, a plurality of movable platforms 50 is disposed between the storage shelves 100B and 100C, and a plurality of movable platforms 50 is disposed between the storage shelves 100C and 100D. The Y-direction width WY1 of the storage shelves 100 and the Y-direction width WY2 of the movable platforms 50 are essentially identical.

The storage shelf 100B and the storage shelf 100C each have a plurality of movable platforms 50 disposed on both sides of each. Moreover, as illustrated in FIG. 4 or FIG. 8, the pickers 60 (or more precisely, the movable frames 62) can be moved in the ±Y directions, relative to the stationary frames 61, by the picker driving portions 65. Because of this, the movable platforms 50 on the left side (the −Y direction side) of the storage shelf 100B are able to transfer loads BG into and out of the storage shelf 100B. Furthermore, the movable platforms 50 on the right side (the +Y direction side) of the storage shelf 100B are able to transfer loads BG into and out of the storage shelf 100B. The same is true for the movable platforms 50 on both sides of the storage shelf 100C.

If loads BG that are retrieved often are stored in the storage shelf 100B or 100C, then it is possible to retrieve the loads BG using multiple movable platforms 50. Although not illustrated in FIG. 9, the number of storage shelves 100 may be, of course, more than 4.

Third Embodiment

Figure 10:
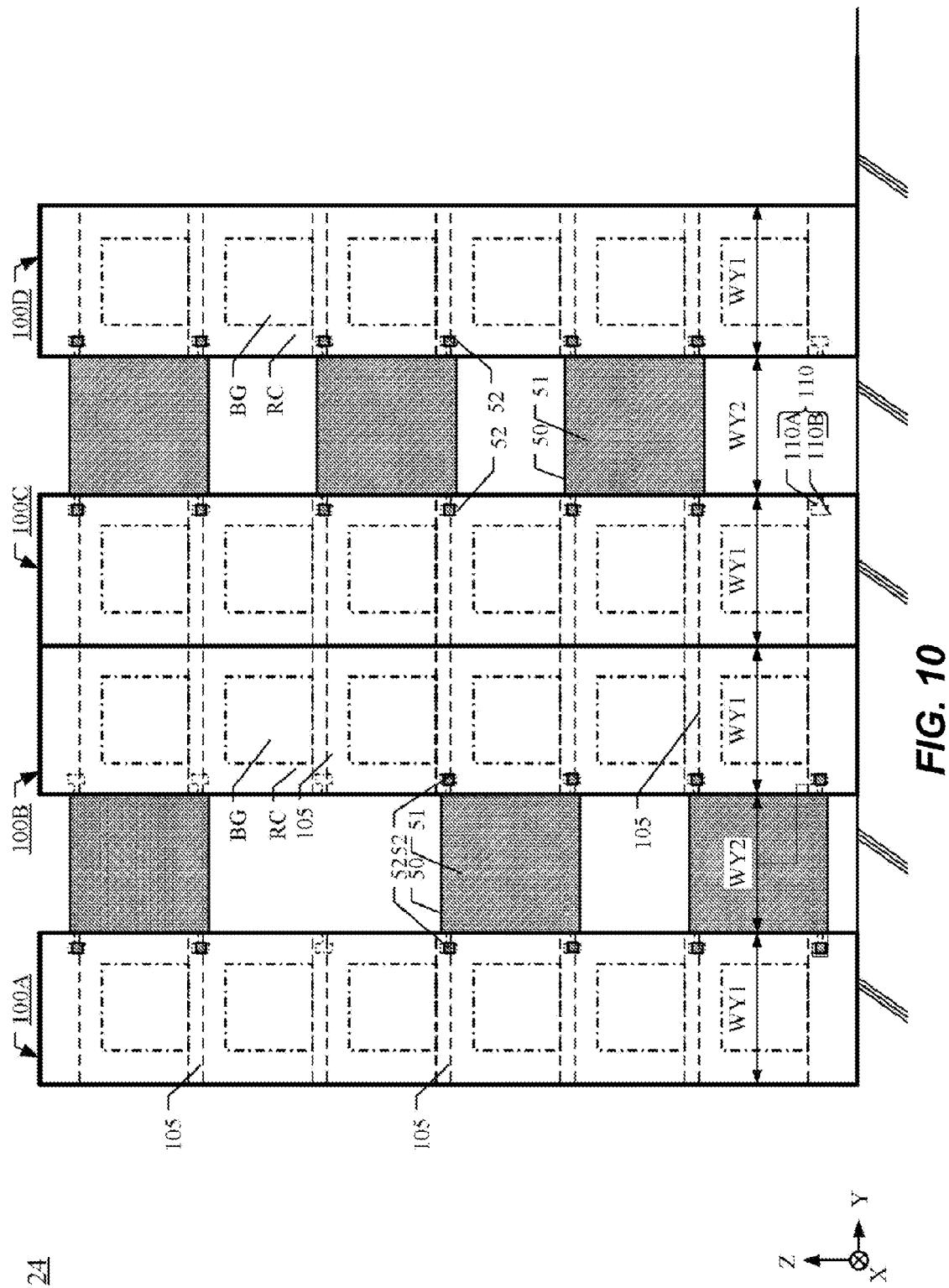
FIG. 10 is a side view diagram, viewed from the X direction, illustrating an automated warehouse system 24 according to a third embodiment of the present disclosure.

An automated warehouse system 24 according to a third embodiment has a plurality of storage shelves 100 (100A through 100D). FIG. 10 is a side view diagram, viewed from the X direction, of the automated warehouse system 24.

The automated warehouse system 24 according to the third embodiment has four storage shelves 100 (100A through 100D), each having a plurality of storage areas RC. A plurality of movable platforms 50 is disposed between the storage shelves 100A and 100B. The storage shelf 100B and the storage shelf 100C adjoin each other, with no room for a movable platform 50 between the storage shelf 100B and the storage shelf 100C. A plurality of movable platforms 50 is disposed between the storage shelves 100C and 100D. The Y-direction width WY1 of the storage shelves 100 and the Y-direction width WY2 of the movable platforms 50 are essentially identical.

Even though the storage shelves 100B and storage shelf 100C adjoin each other, the movable platforms 50 on the left side (the −Y direction side) of the storage shelf 100B are able to transfer loads BG into and out of the storage shelf 100B. Additionally, the movable platforms 50 on the right side (the +Y direction side) of the storage shelf 100C are able to transfer loads BG into and out of the storage shelf 100C. Because of this, even though the storage shelves 100B and storage shelf 100C adjoin each other, and there are no movable platforms 50 between the storage shelves 100B and storage shelf 100C, it is still possible to retrieve loads BG. If there is a large number of storage shelves 100 lined up together, this makes it possible to reduce the width WY2 in the Y direction of the movable platform 50, which enables limited space the used efficiently.

Fourth Embodiment

Figure 11:
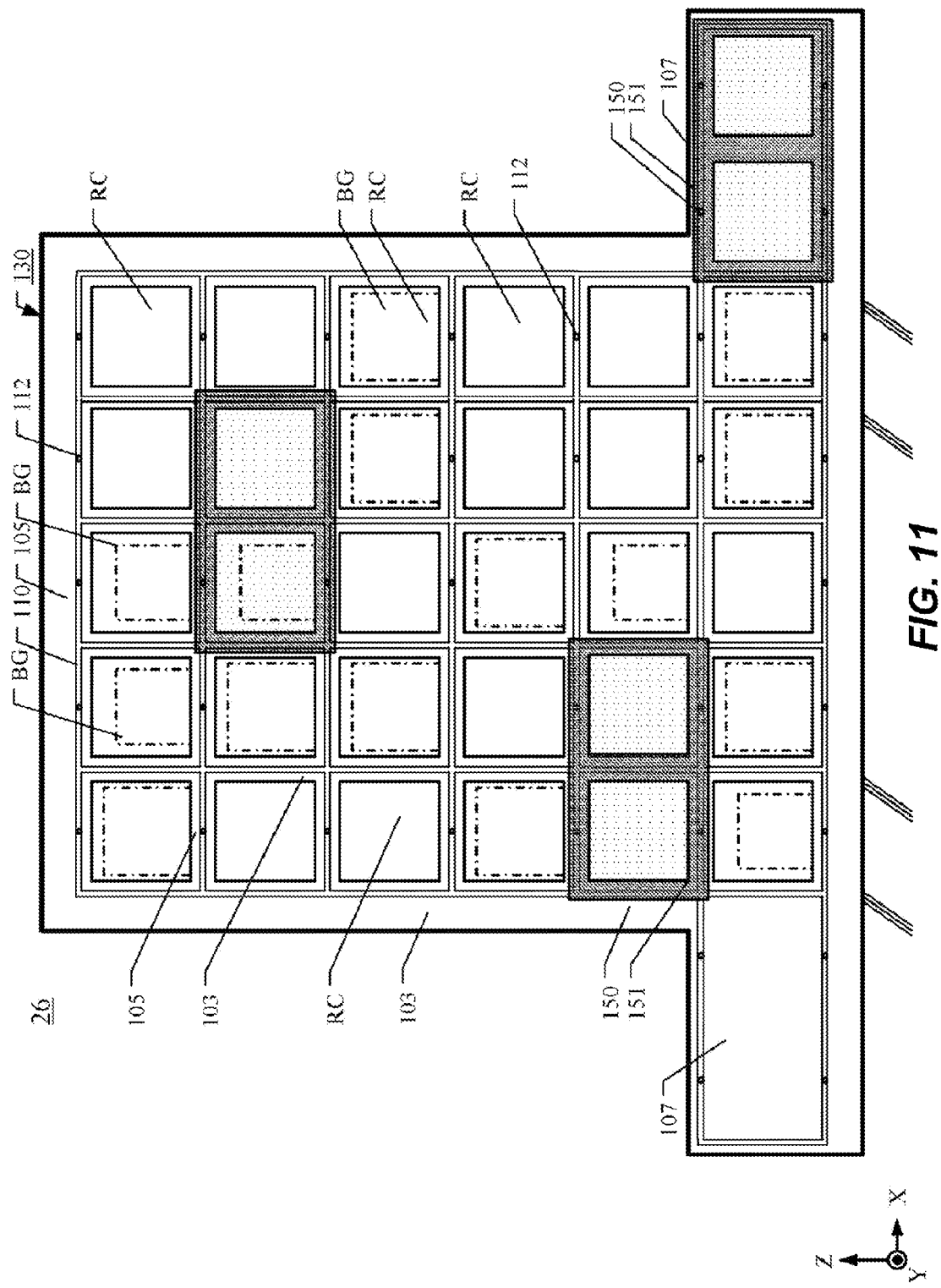
FIG. 11 is a side view diagram, viewed from the Y direction, illustrating an automated warehouse system 26 according to a fourth embodiment of the present disclosure.

The automated warehouse system 26 according to the fourth embodiment has a storage shelf 130. FIG. 11 is a side view diagram, viewed from the Y direction, of the automated warehouse system 26. Those parts that are identical to those in the first embodiment are assigned identical reference characters.

As illustrated in FIG. 11, a storage shelf 130 is built from a plurality of support pillars 103 that extend in the vertical or Z direction and a plurality of beams 105 that extend in the horizontal or X direction. A plurality of storage areas RC is formed from these support pillars 103 and beams 105. As with the first embodiment, guide rails 110 and locking holes 112 are formed. The number of levels and number of columns of storage areas RC are arbitrary, and may be increased or decreased as appropriate depending on an installation space. Loading/unloading ports 107, for transferring loads BG to the movable platform 150 or transferring loads BG from the movable platform 150, are provided on the left and right of the shelf at the bottommost level (on the −Z side). Each loading/unloading port 107 is provided with a size that is twice that of a storage area RC, so as to match the size of the movable platform 150.

The movable platform 150 is of a size that essentially matches the size of two storage areas RC lined up in the horizontal direction (in the XZ plane). The movable platform 150 has a frame body 151. At least two faces of the frame body 151 in the Y direction are open so as to enable loads BG to be transferred in and out of the frame body 151 of the movable platform 150. Moreover, 12 guide rollers 52 are provided for a single frame body 151. When compared to the movable platforms 50 of the first through third embodiments, the movable platform 150 can transfer twice the load BG. While in the fourth embodiment, the movable platform 150 has twice the storage area in the horizontal direction, the storage area may instead be three or more times as much in the horizontal direction. Moreover, the movable platform 150 may also have two or three times the storage area in the vertical direction.

Fifth Embodiment

Figure 12:
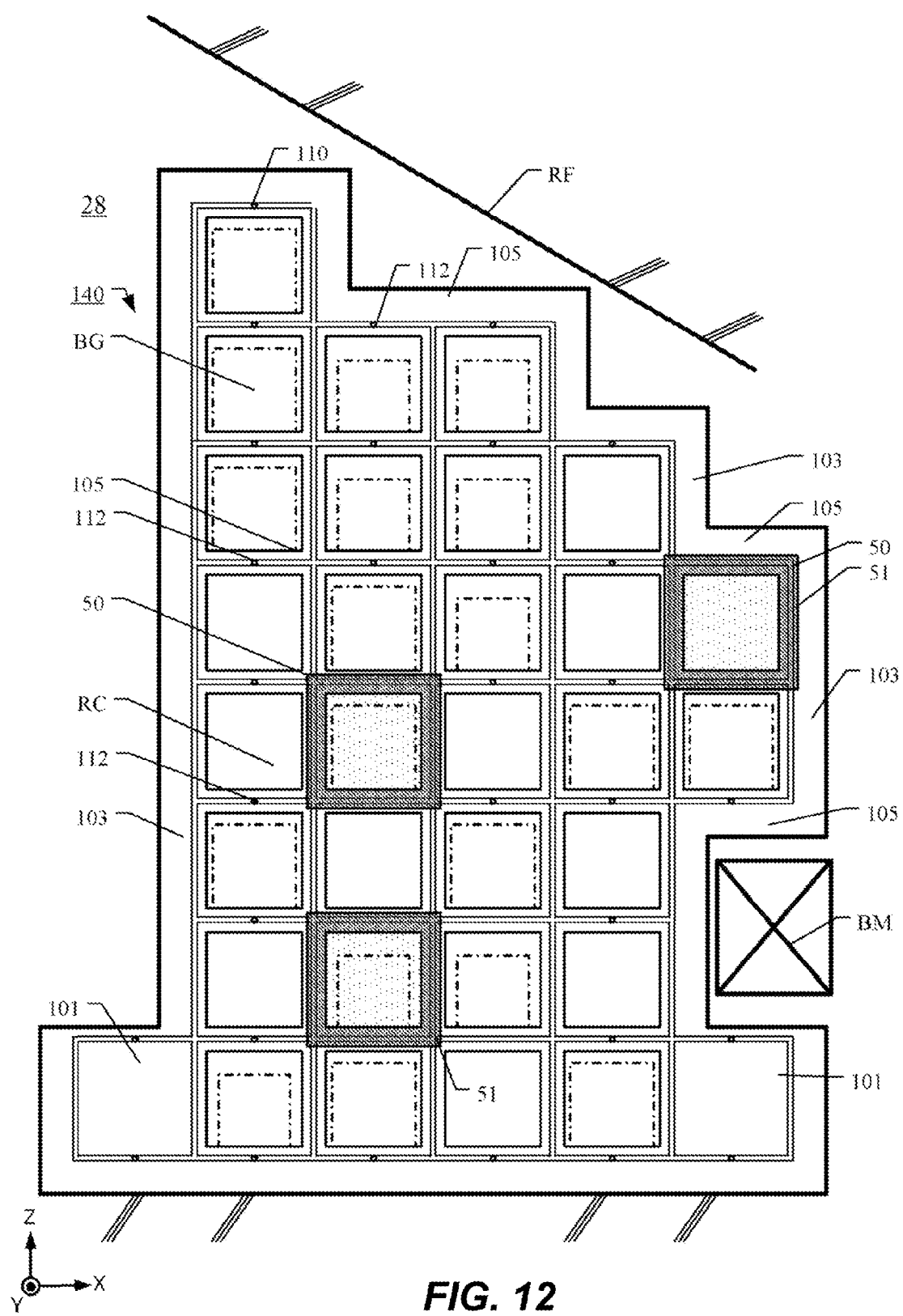
FIG. 12 is a side view diagram, viewed from the Y direction, illustrating an automated warehouse system 28 according to a fifth embodiment of the present disclosure.

An automated warehouse system 28 according to a fifth embodiment has a storage shelf 140. FIG. 12 is a side view diagram, viewed from the Y direction, of the automated warehouse system 28. Those parts that are identical to those in the first embodiment are assigned identical reference characters.

A building that houses the automated warehouse system 28 may have a slanted roof, or may have a plurality of beams. In such cases, conventional storage shelves may be essentially rectangular when viewed from the Y direction. Given this, the space between the ceiling and the storage shelves, or the spaces between the beams and the storage shelves, would not be used effectively. The fifth embodiment is an example wherein the storage shelves 140 use the space between the ceiling and the storage shelves, and the spaces between the beams and the storage shelves, effectively.

As illustrated in FIG. 12, the storage shelf 140 is built from a plurality of support pillars 103 that extend in the vertical or Z direction and a plurality of beams 105 that extend in the horizontal or X direction. A plurality of storage areas RC is formed from these support pillars 103 and beams 105. As with the first embodiment, guide rails 110 and locking holes 112 are formed. In FIG. 12, a ceiling RF is slanted, and there are horizontal beams BM that extend in the Y direction. The support pillars 103 and the beams 105 are assembled in a range wherein they do not conflict with the ceiling RF or the horizontal beams BM. Because of this, storage areas RC are formed even in the space on the left side of the ceiling RF, and storage areas RC are formed also above the horizontal beams BM. With the stacker cranes that move along a travel guide rail, as is conventional, the scope of movement of the stacker crane in the Z direction and in the X direction is limited to the height of the lowest ceiling RF in a range wherein there are no horizontal beams BM. On the other hand, because the movable platforms 50 travel along the guide rails 110 that are disposed on the support pillars 103 and the beams 105, they are able to move in whatever range the support pillars 103 and beams 105 are assembled together.

While preferred embodiments of the present disclosure are explained in detail above, as will be understood by those skilled in the art, in view of the present disclosure, a variety of changes and modifications may be made to these embodiments to provide yet further embodiments without departing from the scope of the present disclosure. For example, while in the first embodiment the locking pins and guide rollers may be moved in the ±Y directions so as to not cause a load on the driving motor, either the locking pins or the guide rollers, or both, may be moved in the ±Y directions in other embodiments. Moreover, while the movable platform may be disposed between the storage shelves and supported by eight guide rollers in some embodiments, the movable platform may be supported on only one side by four guide rollers in other embodiments.

EXPLANATION OF REFERENCE CHARACTERS 20, 22, 24, 26: Automated Warehouse Systems
50, 150: Movable Platforms
51, 151: Frame Bodies
52, 152: Guide Rollers
53: Thrust Bearing
54: Y-axis Movable Table
55: Driving Motor
56: Rotational Shaft
60: Picker
61: Stationary Frame
62: Movable Frame
63: Pawl Member
100 (110A through 110D), 130: Storage Shelves
101, 107: Loading/Unloading Ports
110: Guide Rail
112: Locking Hole
RC: Storage Area
BG: Load
SE: Location Sensor
PO: Location Indicator

What is claimed is:

1. An automated warehouse system that stores loads in a plurality of storage areas formed from a plurality of support pillars that extend in the vertical direction and a plurality of beams that extend in the horizontal direction, that transfers the loads to the plurality of storage areas, and that transfers the loads from the plurality of storage areas, the system comprising:
   a vertical guide rail that is disposed on a support pillar of the plurality of support pillars;
   a horizontal guide rail that is disposed on a beam of the plurality of beams; and
   a movable platform having a frame body that has a vertical frame and a horizontal frame, at least part of the frame body having a rectangular shape that is the same as a shape of at least part of at least one of said storage areas, and a guide roller that engages the vertical guide rail that is disposed adjacent the vertical frame or the horizontal guide rail that is disposed adjacent the horizontal frame, the guide roller being movable with respect to the movable platform in a direction that is perpendicular to the vertical guide rail and the horizontal guide rail.

2. The automated warehouse system as set forth in claim 1, wherein:

the movable platform has a picker configured to slide the loads to transfer the loads from the movable platform into the storage areas, and to slide the loads to transfer the loads out of the storage areas into the movable platform.

3. The automated warehouse system as set forth in claim 1, wherein:
the guide roller is disposed at a corner portion of the frame body; and
when the loads are transferred into or transferred out of the movable platform, the guide roller is moved into contact with the vertical guide rail or the horizontal guide rail.

4. The automated warehouse system as set forth in claim 1, further comprising:
a locking device configured to lock the horizontal guide rail and the movable platform together when transferring the loads into or transferring the loads out of the movable platform.

5. The automated warehouse system as set forth in claim 1, wherein:
the guide roller is movable along an edge of the frame body in the horizontal direction to a corner portion of the frame body; and
when the movable platform is moved in the horizontal direction to transfer the loads into or out of the movable platform, the guide roller is located at a center region of the edge of the frame body in the horizontal direction, and when the movable platform is moved in the vertical direction to transfer the loads into or out of the movable platform, the guide roller is located at the corner portion of the frame body.

6. The automated warehouse system as set forth in claim 5, wherein:
the guide roller includes a first guide roller and a second guide roller, where a movement distance of the first guide roller from the center region of the edge of the frame body to the corner portion of the frame body and a movement distance of the second guide roller from a center region of another edge of the frame body in the horizontal direction to a corner portion of the frame body are different.

7. The automated warehouse system as set forth in claim 1, wherein:
the movable platform is disposed between a first storage shelf that includes a plurality of storage areas, and a second storage shelf that includes a plurality of storage areas and that is disposed so as to face the first storage shelf;
the guide roller includes a first guide roller and a second guide roller; and
the first guide roller is disposed on a first side of the movable platform that faces the first storage shelf and the second guide roller is disposed on a second side of the movable platform that faces the second storage shelf.

8. The automated warehouse system as set forth in claim 7, further comprising another movable platform, wherein:
the other movable platform is disposed between a third storage shelf that includes a third plurality of storage areas, and a fourth storage shelf that includes a fourth plurality of storage areas and that is disposed so as to face the third storage shelf; and
the second storage shelf adjoins the third storage shelf.

9. The automated warehouse system as set forth in claim 1, wherein:
the frame body of the movable platform corresponds to a plurality of adjoining storage areas.

10. An automated warehouse system that stores loads in a plurality of storage areas formed from a plurality of support pillars that extend in the vertical direction and a plurality of beams that extend in the horizontal direction, that transfers the loads to the plurality of storage areas, and that transfers the loads from the plurality of storage areas, the system comprising:
a vertical guide rail that is disposed on a support pillar of the plurality of support pillars;
a horizontal guide rail that is disposed on a beam of the plurality of beams; and
a movable platform having a frame body that has a vertical frame and a horizontal frame, at least part of the frame body having a rectangular shape that is the same as a shape of at least part of at least one of said storage areas, and a guide roller that engages the vertical guide rail that is disposed adjacent the vertical frame or the horizontal guide rail that is disposed adjacent the horizontal frame,
wherein the guide roller is movable along an edge of the frame body in the horizontal direction to a corner portion of the frame body; and
wherein, when the movable platform is moved in the horizontal direction to transfer the loads into or out of the movable platform, the guide roller is located at a center region of the edge of the frame body in the horizontal direction, and when the movable platform is moved in the vertical direction to transfer the loads into or out of the movable platform, the guide roller is located at the corner portion of the frame body.

11. The automated warehouse system as set forth in claim 10, wherein:
the movable platform has a picker configured to slide the loads to transfer the loads from the movable platform into the storage areas, and to slide the loads to transfer the loads out of the storage areas into the movable platform.

12. The automated warehouse system as set forth in claim 10, wherein:
the guide roller is disposed at a corner portion of the frame body, and is movable in a direction that is perpendicular to the vertical guide rail and the horizontal guide rail; and
when the loads are transferred into or transferred out of the movable platform, the guide roller is moved into contact with the vertical guide rail or the horizontal guide rail.

13. The automated warehouse system as set forth in claim 10, further comprising:
a locking device configured to lock the horizontal guide rail and the movable platform together when transferring the loads into or transferring the loads out of the movable platform.

14. The automated warehouse system as set forth in claim 10, wherein:
the frame body of the movable platform corresponds to a plurality of adjoining storage areas.

15. An automated warehouse system that stores loads in a plurality of storage areas formed from a plurality of support pillars that extend in the vertical direction and a plurality of beams that extend in the horizontal direction, that transfers the loads to the plurality of storage areas, and that transfers the loads from the plurality of storage areas, the system comprising:
a vertical guide rail that is disposed on a support pillar of the plurality of support pillars;
a horizontal guide rail that is disposed on a beam of the plurality of beams; and a movable platform having a frame body that has a vertical frame and a horizontal frame, at least part of the frame body having a rectangular shape that is the same as a shape of at least part of at least one of said storage areas, and a guide roller that engages the vertical guide rail that is disposed adjacent the vertical frame or the horizontal guide rail that is disposed adjacent the horizontal frame, wherein the guide roller is movable along an edge of the frame body in the horizontal direction to a corner portion of the frame body, wherein, when the movable platform is moved in the horizontal direction to transfer the loads into or out of the movable platform, the guide roller is located at a center region of the edge of the frame body in the horizontal direction, and when the movable platform is moved in the vertical direction to transfer the loads into or out of the movable platform, the guide roller is located at the corner portion of the frame body, and wherein the guide roller includes a first guide roller and a second guide roller, where a movement distance of the first guide roller from the center region of the edge of the frame body to the corner portion of the frame body and a movement distance of the second guide roller from a center region of another edge of the frame body in the horizontal direction to a corner portion of the frame body are different.

16. The automated warehouse system as set forth in claim 15, wherein:

the movable platform is disposed between a first storage shelf that includes a plurality of storage areas, and a second storage shelf that includes a plurality of storage areas and that is disposed so as to face the first storage shelf;

the guide roller includes a first guide roller and a second guide roller; and the first guide roller is disposed on a first side of the movable platform that faces the first storage shelf and a second guide roller is disposed on the second side of the movable platform that faces the second storage shelf.

17. The automated warehouse system as set forth in claim 16, further comprising another movable platform, wherein:

the other movable platform is disposed between a third storage shelf that includes a third plurality of storage areas, and a fourth storage shelf that includes a fourth plurality of storage areas and that is disposed so as to face the third storage shelf; and the second storage shelf adjoins the third storage shelf.

18. The automated warehouse system as set forth in claim 15, wherein:

the frame body of the movable platform corresponds to a plurality of adjoining storage areas.

19. The automated warehouse system as set forth in claim 15, wherein:

the movable platform has a picker configured to slide the loads to transfer the loads from the movable platform into the storage areas, and to slide the loads to transfer the loads out of the storage areas into the movable platform.

20. The automated warehouse system as set forth in claim 15, wherein:

the guide roller is disposed at a corner portion of the frame body, and is movable in a direction that is perpendicular to the vertical guide rail and the horizontal guide rail; and when the loads are transferred into or transferred out of the movable platform, the guide roller is moved into contact with the vertical guide rail or the horizontal guide rail.

\* \* \* \* \*